INVENTOR.
PHILIP D. COREY
BY
HIS ATTORNEY

United States Patent Office 3,448,367
Patented June 3, 1969

3,448,367
INVERTER INHIBIT CIRCUITS
Philip D. Corey, Crozet, Va., assignor to General Electric Company, a corporation of New York
Filed Sept. 19, 1966, Ser. No. 580,421
Int. Cl. H02m 1/18, 7/44, 7/68
U.S. Cl. 321—12                                9 Claims

ABSTRACT OF THE DISCLOSURE

This application discloses an inhibit circuit for an inverter. Load current is sensed and firing of the SCR's in the inverter is inhibited as a function of the polarity of the load current so that when the load current is positive, the trigger pulse to the negatively poled SCR(s) is inhibited. Alternative embodiments provide for load current sensing using either bilaterally connected diodes or a current transformer. The indication from the load current sensors is connected to a third winding on an isolation transformer which is connected between the trigger pulse source and the SCR's. The current sensors act to short out this third winding (and thereby inhibit firing) if a trigger pulse is generated before the load current has reversed. Operation is enhanced by providing snap-action switches (such as Shockley diodes) and time delay circuits in series with the triggering windings of the isolation transformer so that the output of the current sensors acts to inhibit the operation of the time delay circuits.

---

This invention relates to inhibit circuits for use in inverters. More particularly, the invention relates to inhibit circuits for inverters of the type in which the current supplied to the load in one direction decreases to a desired level before current is applied to the load in a second direction.

Inverters of the static type convert direct voltage to alternating voltage by alternately switching direct voltage sources of opposite polarities across the load. Many static inverters are of the type in which the current supplied to the load in one direction decreases to zero or to a desired level before the other switching devices are turned on to supply current to the load in the opposite direction. The effective use of such inverters, it has been found, can be greatly improved by the use of current inhibit circuits.

Startup, overloads, suddenly applied loads and low power factor conditions cause transient of high current which are injurious at the time of commutation. Since these aberrations in the current are of short duration and because the current in conducting ones of the switching devices ultimately decreases to a safe level, it is desirable to inhibit commutation until the transients have subsided and a safe level of current has been reached. If the current is sensed and commutation is permitted to occur at a low current level, several advantages are obtained. In a forced-commutation inverter, for example, the size of the commutation capacitors can be greatly reduced. Such an inverter is shown in FIGURE 1 of application Ser. No. 202,242 assigned to the assignee of the present invention. In other inverters where the controlled switching devices are self-commutated or load-commutated, i.e., in which the current to the load circuit leads the voltage so that the current flow has reversed and is capable of turning off an off-going switching device prior to an on-coming switching device being turned on, sensing the current level and insuring that the current has reversed or is at zero in the off-going switching devices at commutation eliminates the possibility of shorting the voltage source.

It is accordingly an object of the present invention to provide inhibit circuits for static inverters.

Some features that enhance proper commutation of the switching devices in an inverter include snap-action triggering on of the previously inhibited switching devices to take advantage of the sharp rise time of some of these devices and to prevent burnout which may occur when they are gradually turned on. It is thus another object of the present invention to provide an inhibit circuit for a static inverter having snap-action switch means for triggering the switching devices of the inverter.

Another feature to insure proper commutation is to delay the turning on of switching devices until the off-going devices have recovered their voltage blocking capability. It is thus another object of the present invention to provide an inhibit circuit for a static inverter in which the triggering pulse for the switching elements is delayed sufficiently to permit recovery of the switching devices commutated off.

Another object of the present invention is to provide an inhibit circuit for a static inverter having delayed snap-action triggering of the switching devices.

These and other objects and advantages of the invention will be better understood from a detailed description of examples of inhibit circuits shown in the drawings in which FIGURE 1 is a schematic drawing of a half-bridge inverter with a current sensor;

Figure 1:
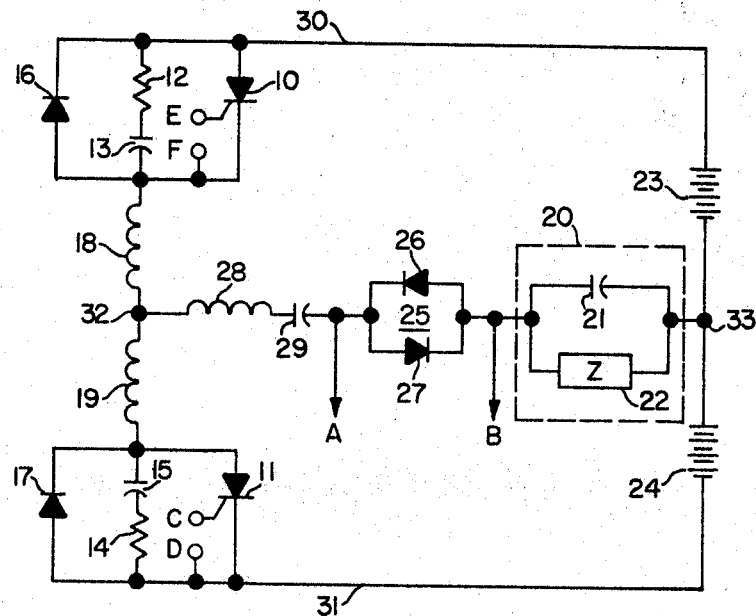

Referring to the drawings wherein like reference numerals designate like parts throughout, there is shown in FIGURE 1 an inverter of the self-commutation type having switching devices 10 and 11 which are shown as silicon controlled rectifiers. SCR's 10 and 11 apply direct voltage sources 23 and 24 across a load 20 in alternate succession in response to gating signals being supplied to the gate-cathode terminals of these devices, respectively designated EF and CD. The positive terminal of voltage source 23 is shown coupled to the anode of SCR 10 by conductor 30. The negative terminal of this voltage source is coupled to one side of the load at junction 33. Voltage source 24 has its positive pole connected to one side of the load at junction 33, the negative pole of this voltage source being coupled to the cathode of SCR 11 by conductor 31. These voltage sources are applied to the load 20 via inductors 18 and 19, inductor 28, capacitor 29 and the current sensing circuit 25 which completes the current paths through the load to the common junction 33.

The load circuit 20, which may be referred to as the circuit load, includes the external load impedance 22 and a capacitor 21. This capacitor is of sufficient size to tune the load 20 leading under normal conditions, i.e., the current to the load leads the voltage across the load. It should be noted that the load is intended to include capacitor 21 and the impedance 22 as is indicated in the drawings by dashed line 20.

Since the current leads the change in the polarity of the voltage applied to the load and thus seeks a path to flow from the load when, for example, SCR 10 is no longer conducting and SCR 11 has not yet begun to conduct, there is provided a diode 16 coupled across SCR 10 to permit the current to flow from the load to source 23. Likewise diode 17 connected across SCR 11 permits the current to return to source 24.

FIGURE 1 also shows a resistor 12 and capacitor 13 coupled across SCR 10 and a resistor 14 and capacitor 15 coupled across SCR 11. Each of these RC circuits provides energy storage to limit the rate of rise of the voltage applied across SCR 10, for example, when the current flow goes out in diode 16 and is transfered to SCR 11. Inductor 18 aids in this cause. The inductors 18 and 19 also slow the buildup of current in the on-coming switch, namely SCR 11 in the above example.

Figure 3:
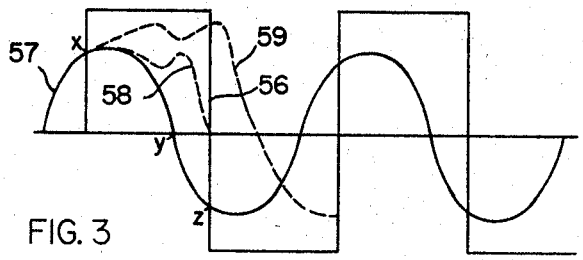
FIGURE 3 is a voltage and current versus time plot of the inverter circuit shown in FIGURES 1 and 4.

Before completing the description of FIGURE 1, it is felt advisable to refer to FIGURE 3 for a better understanding of the inverter operation. FIGURE 3 shows a sine wave 57 representing the current through load 20. This curve appears as a sine wave due to the filtering action of inductor 28 in comibnation with inductor 18 or inductor 19 and the capacitor 29. The square wave 56 shows the voltage applied to the load as seen between junction points 32 and 33. It is noted that the current wave 57 leads the voltage wave 56 such that during normal operation during the first positive half cycle the current between points x and y represents the current supplied by SCR 10. The current then reverses at point y and goes negative flowing through the feedback diode 16 from points y to z as shown in FIGURE 3. When diode 16 conducts a back bias is created across SCR 10 commutating this device off. At point z, SCR 11 conducts to apply source 24 to the load and continue the flow of negative current.

Dashed line curves 58 and 59 are examples of alteration in this current-voltage relationship such as may be caused by transients. Curve 58 shows the current approximately in phase with the voltage. In this situation, the current reversal does not lead the voltage reversal for sufficient time to insure that SCR 10 has recovered its voltage blocking characteristic before SCR 11 is turned on. If this happens, there exists a substantially short circuit across the sources 23 and 24. Curve 59 shows the load exhibiting a lagging power factor occasioned by startup overloads, suddenly applied loads or low power factor conditions. In this situation, there is no interval y-z where load current is returned to the source through a feedback diode such as diode 16 causing SCR 10 to be back biased and commutated off so that both SCR 10 and SCR 11 are conducting with the same hazardous result. This intolerable condition that is caused by current transients in self-commutated inverters and the need for commutating capacitors of increased size in forced-commutated inverters point to the utility of a device to delay the triggering of on-coming switching devices until the current supplied by off-going switching devices has decreased to a safe level.

Referring again to FIGURE 1, there is shown a current sensing circuit 25 coupling capacitor 29 to load 20. Current sensing circuit 25 consists of a pair of diodes 26 and 27 connected anodes to cathodes so that each diode is capable of conducting current in the opposite direction from that conducted by the other. Diode 27 passes current which is normally supplied by SCR 10 or feedback diode 17 to the load and develops a positive to negative voltage drop at points A and B. Diode 26 establishes a positive to negative voltage drop from points B to A in conducting current which normally flows through SCR 11 or feedback diode 16. The current sensing means 25 thus provides an indication of one sense to indicate current flow in one direction and an indication of the opposite sense to indicate current flowing in the reverse direction.

Figure 2:
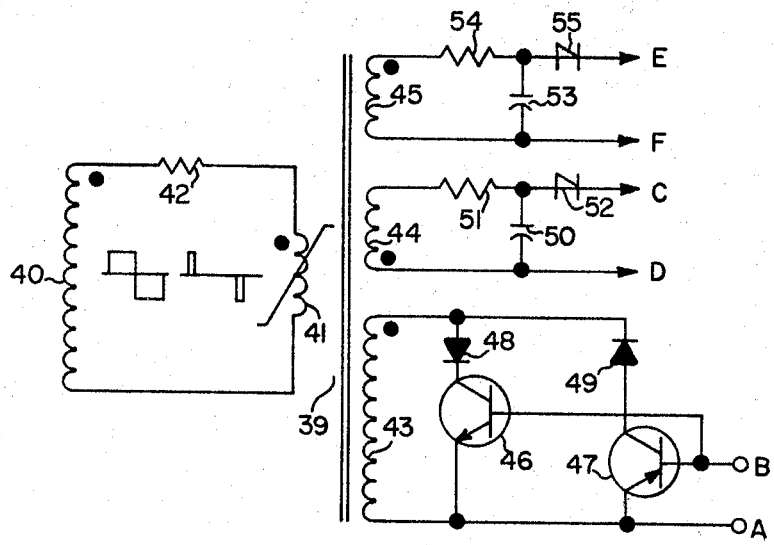
FIGURE 2 is a schematic diagram of an inhibit circuit used with the inverter shown in FIGURE 1.

FIGURE 2 shows a transformer winding 40 representing the output transformer from a source of alternating control signals which serve to trigger SCR's 10 and 11. These alternating control signals are shown as a square wave at the output of winding 40 and in the absence of an inhibit circuit could be applied directly to terminals EF and CD of the SCR's. Or, alternately, saturable transformer 39 having a primary winding 41 and secondary windings 44 and 45 could directly couple the alternating pulses shown at the primary winding to SCR's 10 and 11. Transformer 39 is added with the inhibit circuit to isolate the gating circuit from the inverter and load circuits. The choice of a saturable transformer is purely optional, the chief advantage being that with a saturable transformer, the size of the component may be smaller. Transformer 39 has primary winding 41 coupled to receive the square wave from winding 40 by current limiting resistor 42. The short pulses indicated at the primary winding 41 are caused by the periodic saturation of this device with the application of the square wave from winding 40. The dots shown at one end of each of the transformer windings indicate that a positive voltage at the dotted end of primary winding 41 will appear at the dotted end of secondary winding 45 to turn on SCR 10, while a negative voltage will cause output terminal C of winding 44 to be positive with respect to terminal D to turn SCR 11 on.

FIGURE 2 shows that the output from the current sensing means 25 is applied across the emitter base terminals of transistors 46 and 47 which are connected in parallel at terminals AB. The emitter of the NPN transistor 46 is coupled to the undotted end of secondary winding 43 of transformer 39, the collector of this transistor being connected to the dotted end of winding 43 by diode 48 and the base lead of this transistor connected to input terminal B. PNP transistor 47 has its emitter connected to the undotted end of winding 43 and its collector connected to the dotted end of this winding via diode 49 while its base is also connected to input terminal B. The emitters of both transistors are connected to the input terminal A. This combination of transistors acts as a switch selectively to short out winding 43 thereby inhibiting transformer 39 from transferring pulses from output winding 40 to secondary windings 44 and 45. Thus, if SCR 10 is conducting, terminal A of the current sensor 25 will be positive with respect to terminal B so that transistor 46 is inhibited from conducting. Since SCR 10 conducts during the occurrence of a positive pulse from the source of control signals at 40, secondary winding 43 has a positive voltage at its dotted end which prevents transistor 47 from conducting. With both transistors thus prevented from conducting, winding 43 is not shorted out and the positive pulse to SCR 10 is allowed to pass through winding 45 to terminals E and F. After the current has reversed, and terminal B is positive with respect to terminal A, it will be seen that SCR 11 will be permitted to conduct upon the occurrence of a negative pulse from the source 40. At this time, the undotted end of winding 43 is positive so that transistor 46 is prevented from conducting and only transistor 47 could conduct but this transistor is prevented from conducting by the positive sense of the signal from the current sensing means 25 which makes terminal B positive with respect to terminal A. Thus the negative pulse is allowed to be applied to terminals C and D via transformer winding 44. If at the time a negative pulse from source 40 is generated, the current flow has not yet reversed and terminal A is positive with respect to terminal B, the negative pulse inhibits transistor 46 but permits transistor 47 to conduct. This transistor does turn on due to terminal A still being positive with respect to terminal B and thus with secondary 43 of the transformer shorted out, there is no transformer action and the application of the negative pulse to terminals C and D is prevented.

Figure 5:
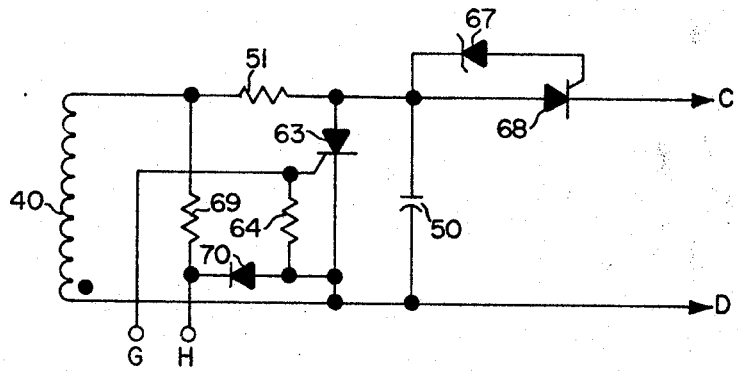
FIGURE 5 is a schematic diagram of an inhibit circuit which may be used with the inverter shown in FIGURE 4.

FIGURE 2 also shows that to each secondary winding 44 and 45, there is coupled a resistor and capacitor circuit and a Shockley diode. Resistor 51 in combination with capacitor 50 constitutes an integrating circuit which provides a time delay for any negative pulse which is inverted by the winding 44. Upon the application of such a pulse to winding 44, capacitor 50 will charge at a rate determined by the values of resistor 51 and capacitor 50 until such time that the positive potential across capacitor 50 is sufficient to cause the switch device 52 to break down. Resistor 54 in conjunction with capacitor 53 and switch device 55 provide a similar function for secondary winding 45. The switch devices 52 and 55 may be Shockley diodes as illustrated in the figure or any other snap-action switch device which snaps into conduction upon the application of an increasingly positive potential at the input thereof. An alternative snap-action switch is shown in FIGURE 5.

Resistor 42 in the primary circuit of transformer 39 can provide another function in addition to that of limiting the current into the primary winding 41. With careful selection of the value of this resistor and the turns ratio of transformer 39 the reflected value of resistor 42 in the secondary windings can be used to replace resistors 51 and 54. The circuit is readily simplified where it is possible to take advantage of this added function.

The time delay that is provided by the time delay circuits in each secondary of transformer 39 is designed to prevent one SCR from turning on before the off-going SCR has had time to recover its blocking function, thus the time constant of each delay circuit is set to be coincident with or slightly greater than the recovery time of the off-going switch. Thus, the values of resistor 51 and capacitor 50 are selected to provide a time constant coincident with the recovery time of SCR 10.

Figure 4:
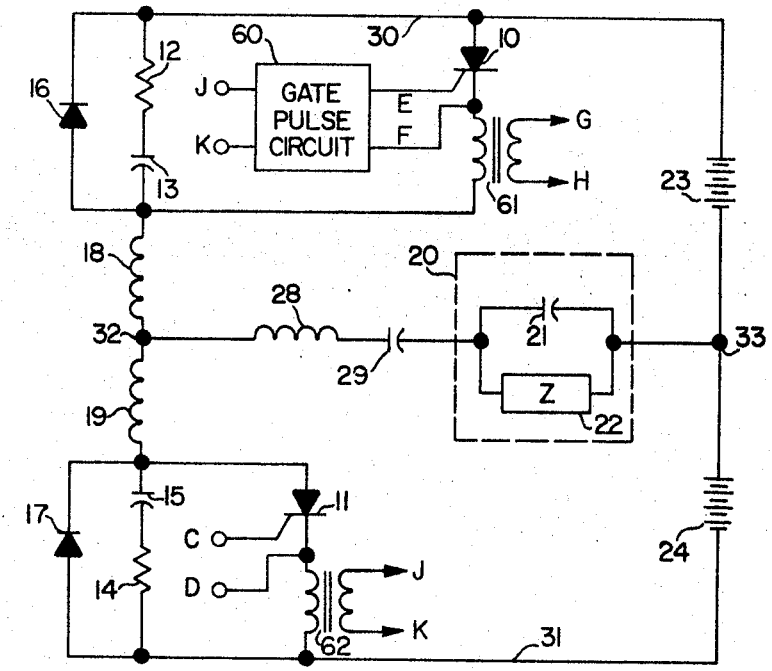
FIGURE 4 is a schematic diagram of the same inverter shown in FIGURE 1 with a different current sensing arrangement.

FIGURE 4 shows a half-bridge inverter identical to the inverter shown in FIGURE 1 with the exception that the current sensing diodes in series with the load are now replaced by current transformers 61 and 62 respectively in series with SCR's 10 and 11. The current transformers so placed enable detection of the current flow in each switching device. Also in this figure, for the sake of simplicity, instead of repeating the illustration of the gate pulse circuit which includes the time delay and pulse forming circuitry such as was repeated for each SCR in FIGURE 2, a gate pulse circuit 60 is shown in block form coupled to SCR 10. Thus the output from the secondary winding of current transformer 62 indicated JK is applied to the input terminals of like designation of gate pulse circuit 60. The output of the gate pulse circuit is then applied across the gate-cathode electrodes EF of SCR 10. The details of a gate pulse circuit for SCR 11 are shown in FIGURE 5.

FIGURE 5 shows a gate pulse circuit for SCR 11 which is substantially identical to the gate pulse circuit 60 for SCR 10. Here again the output winding 40 of a source of control signals serves as a common element for each gate pulse forming circuit. The output of the secondary winding of current transformer 61 indicated G and H is applied to the input terminals G and H of the circuit shown in FIGURE 5. When current is flowing through SCR 10, the indication provided by the current sensing means 61 will be positive at terminal G with respect to terminal H. If this output indication of current flow is above a threshold determined primarily by the value of resistor 64, SCR 63 will conduct to prevent capacitor 65 from charging when a negative pulse is applied to winding 40. The polarity dot of winding 40 indicates that a negative pulse appearing across this winding results in the undotted end of the winding being positive with respect to the dotted end. A negative pulse thus normally triggers SCR 11 into conduction. It is noted that winding 40 would have its output terminals reversed in its connection to gate pulse circuit 60 so that the dotted end of the winding is connected to the anode of SCR 63 whereby SCR 10 is triggered by positive pulses.

As soon as the current through SCR 10 has reduced to a desired level which is zero for the inverter shown in FIGURE 4, SCR 63 no longer conducts and the positive potential at the undotted end of winding 40 is applied to capacitor 50 via resistor 51, these two devices forming a time delay circuit in all respects similar to those shown in FIGURE 2. As the charge on capacitor 50 builds up, it will reach a threshold determined by the Zener diode 67 coupled to the output terminal of the time delay means at the junction between resistor 51 and capacitor 50 and to the gate electrode of SCR 68. When this threshold voltage is achieved, diode 67 breaks down permitting current to flow into the gate of SCR 68 and the pulse from the winding 40 is transferred to the gate of SCR 11. SCR 68 and Zener diode 67 are the full equivalent of the Shockley diode shown in FIGURE 2, forming another version of the snap-action switch required for the proper turn-on of the power SCR's.

When the current flowing through SCR 10 has decreased to the desired level which is the threshold at which SCR 63 no longer conducts and thus no longer inhibits the initiation of the time delay, the presence of the negative pulse at winding 40 causes current to flow through resistor 69 back through the secondary winding of transformer 61 from terminal H to terminal G. The undotted end H of this winding is thus positive with respect to the dotted end and the core is reset. The reset current path is completed by resistor 64 and diode 70. The diode 70 prevents the reset current from flowing directly through resistor 69 to the dotted end of winding 40 which would occur if resistor 64 were directly connected to terminal H. This diode also provides a path for a current to flow when the current transformer is generating a signal to turn on the switch 63. Since the current sensing transformer 61 is reset by current supplied to the secondary winding through resistor 69 during the same negative half cycle in which this transformer acts as a current generator to trigger the inhibit switch 63, the value of resistor 69 in addition to the value of resistor 64 determines the threshold at which the inhibit switch 63 no longer conducts.

On the next positive half cycle of the alternating control signals, winding 40 connected also at its dotted end to the counterpart of resistor 51 in gate pulse circuit 60 and at its undotted end to a terminal F will supply a positive pulse to this gate pulse circuit. The indication from current transformer 62 is also received by circuit 60 at input terminals J and K.

The present invention has been described with reference to a particular inverter and to specific embodiments of the inhibit circuit. It is to be understood that this invention is not limited to a particular inverter or inhibit circuit. For example, a full bridge inverter having four switching devices could as readily be substituted for the inverters shown in FIGURES 1 and 4. Instead of the self-commutated inverter described, a forced-commutation inverter of the type shown in the above-mentioned application Ser. No. 202,242 could readily be substituted. In fact, any static inverter in which the current through conducting ones of the switching devices decreases to a desired level prior to the turning on of the other switching devices would be a suitable inverter to receive the advantages of this invention. While FIGURE 1 shows a current sensing circuit consisting of diodes in series with the load circuit, it is to be understood that the current transformer shown in series with the switching devices in FIGURE 4 could readily be substituted for the diode circuit shown in FIGURE 1. Likewise, a diode sensing circuit could easily perform the current sensing function in the path of each switching device. Here a single diode would suffice to indicate the unidirectional current flow.

Modifications also are easily achieved in the inhibit any time delay circuits shown in FIGURES 2 and 5. For example, if the current sensing transformer of FIGURE 4 were to replace the diode circuit of FIGURE 1, the output for the secondary of this transformer could be applied to a switch such as transistors 46 and 47 in the secondary of a transformer 39 as shown, but this is unnecessary as the use of a current transformer as the current sensing element provides inherent isolation between the circuits and transformer 39 is thus not necessary for this purpose. The very embodiments shown in FIGURE 2 and FIGURE 5 themselves suggest many variations. The transistors in FIGURE 2 are readily interchangeable with SCR 63 shown in FIGURE 5. The Shockley diodes 52 or 55, as has been mentioned, are easily interchangeable with the SCR 68 and Zener diode 70 combination to provide the snap-action switch function. Resistor 69 appears in FIGURE 5 to provide reset current for the current sensing transformer since these transformers were chosen to be of the saturable type due to increased sensitivity of such devices. Were these transformers to be of the non-saturable type, resistor 69 could be eliminated. In addition, resistor 64, shown in FIGURE 5, is only one of many devices that may be used to provide a conduction threshold for SCR 63. The function performed by resistor 64 could be readily performed by a battery or a Zener diode, for example.

Thus, it is to be understood that the specific embodiments that have been used to explain the present invention are for the purpose of description only and should not be taken by way of limitation.

What is claimed and desired to be secured by Letters Patent of the United States is:

1. In an inverter having a plurality of controlled switching devices including one or more controlled switching devices to periodically supply current to a load in one direction and one or more controlled switching devices to alternately supply current to said load in the opposite direction, said inverter being of the type in which the current flow through conducting ones of said controlled switching devices will decrease to a desired level in the absence of transients by the time other ones of said controlled switching devices are turned on, the improvement comprising current sensing means coupled to each of said controlled switching devices to provide an indication of the current level in each switching device, and inhibit means coupled to each of said current sensing means, each inhibit means coupled to a current sensing means for a controlled switching device which conducts current in said one direction inhibiting the turning on of controlled switching devices which conduct current in said opposite direction until said transients if any have subsided and the current flowing in said one direction has decreased to said desired level, and each inhibit means coupled to a current sensing means for a controlled switching device which conducts current in said opposite direction inhibiting the turning on of controlled switching devices which conduct current in said one direction until said transients if any have subsided and the curent flowing in said opposite direction has decreased to said desired level.

2. The improvement in an inverter as recited in claim 1 wherein said inhibit means includes time delay means coupled to each of said controlled switching devices and threshold sensitive means coupled to each of said current sensing means, each of said threshold sensitive means being responsive to the indication from the corresponding one of said current sensing means to inhibit the initiation of the time delay in time delay means associated with those ones of said controlled switching devices about to be turned on until the current in conducting ones of said controlled switching devices has decreased to said desired level.

3. In an inverter having a plurality of controlled switching devices including a first group of one or more controlled switching devices which conduct in response to the positive signals from a source of alternating control signals to apply a voltage source of one polarity to a load to cause current to flow therethrough in a first direction and a second group of one or more controlled switching devices which conduct in response to the negative signals from said source of alternating control signals to apply a voltage source of the opposite polarity across said load to cause current to flow therethrough in a second direction, said inverter being of the type in which current flowing through the load reverses direction to lead the change of polarity of the voltage applied to said load by said controlled switching devices in the absence of transients, and further including feedback means coupled across each controlled switching device for returning the leading current to the appropriate voltage source, the improvement comprising current sensing means coupled to said load, said current sensing means developing an indication of one sense when current flow through said load is in said first direction and an indication of the opposite sense when current flow is in said second direction, switch means coupled to said current sensing means and to said source of alternating control signals, said switch means preventing a negative signal from being applied to said second group of controlled switching devices so long as the indication from said current sensing means is of said one sense and preventing a positive signal from being applied to said first group of controlled switching devices so long as the indication from said current sensing means is of said opposite sense, and time delay means coupled to each controlled switching device and to said source of alternating control signals to delay the application of a control signal to turn on a controlled switching device for a period commensurate with the recovery time of those controlled switching devices just turned off.

4. The improvement in an inverter as recited in claim 3 wherein said current sensing means is a pair of diodes coupled anodes to cathodes, each diode thereby being capable of conducting load current flowing in a different one of the two directions and developing a voltage drop thereacross of the appropriate polarity to indicate the direction of current flow.

5. The improvement in an inverter as recited in claim 3 wherein said current sensing means is a current transformer having a primary winding coupled in series with said load and a secondary winding coupled to said switch means.

6. In an inverter having a plurality of controlled switching devices including a first group of one or more controlled switching devices which conduct in response to the positive signals from a source of alternating control signals to supply current to a load in one direction and a second group of one or more controlled switching devices which conduct in response to the negative signals from a source of alternating control signals to supply current to the load in the opposite direction, said inverter being of the type in which current flow through the controlled switching devices in the one of said groups which is conducting will decrease to zero in the absence of transients by the time the other group of controlled switching devices is turned on, the improvement comprising current sensing means coupled to each of said controlled switching devices to provide an indication of the current level in each switching device, time delay means coupling said source of alternating control signals to each controlled switching device and switch means coupled to each of said current sensing means, those of said switch means responsive to the indication from current sensing means associated with said first group of controlled switching devices inhibiting time delay means from coupling negative signals to controlled switching devices in said second group until said indication is zero and those of said switching means responsive to the indication from current sensing means associated with said second group of controlled switching devices inhibiting time delay means from coupling positive signals to controlled switching devices in said first group until said indication is zero.

7. The improvement in an inverter as recited in claim 6 wherein each of said time delay means includes a threshold sensitive snap-action switch and a capacitor, said threshold switch being triggered into conduction to pass a control signal to the controlled switching device when the charge on said capacitor reaches said threshold.

8. An improvement in an inverter as recited in claim 6 wherein each of said current sensing means is a diode which develops a voltage drop thereacross so long as the controlled switching device to which it is coupled is conducting current.

9. An improvement in an inverter as recited in claim 6 wherein each of said controlled switching means is a current transformer having a primary winding coupled in series with the associated controlled switching device and a secondary winding coupled to the appropriate one of said switch means.

References Cited

UNITED STATES PATENTS

| | | | |
|---|---|---|---|
| 3,120,633 | 2/1964 | Genuit | 321—45 |
| 3,120,634 | 2/1964 | Genuit | 321—45 |
| 3,258,674 | 6/1966 | Relation et al. | 321—45 X |

JOHN F. COUCH, *Primary Examiner.*

W. H. BEHA, JR., *Assistant Examiner.*

U.S. Cl. X.R.

321—45